United States Patent Office 3,136,642
Patented June 9, 1964

3,136,642
IMMERSION FREEZING OF FRUITS AND
VEGETABLES
George T. Backinger and John A. Frane, Albion, N.Y., assignors to General Foods Corporation, White Plains, N.Y., a corporation of Delaware
No Drawing. Filed May 16, 1962, Ser. No. 195,307
7 Claims. (Cl. 99—193)

This invention relates to improving the textural characteristics of frozen edible plant materials. More particularly this invention is concerned with the treatment of fruits and vegetables in such a manner as endows the particular fruit or vegetable with a desirable texture after the material is thawed from a frozen state.

Many fruits and vegetables undergo a deterioration in their cellular structure or turgidity as a result of the stresses induced in the tissue as the water content thereof freezes. The expansion of the moisture content in the plant material to ice crystals causes a rupture of the cell walls and a physical breakdown in the structural identity of the plant material. One technique for inhibiting texture deterioration is to accelerate the rate of freezing of the water present in the plant material to induce the creation of tiny or small crystals as distinguished from the relatively large ice crystals produced by such procedures as plate or tunnel freezing. While the turgor of many fruits and vegetables is not adversely affected upon thawing the product in either the raw, partially cooked, or fully cooked state, other products suffer from a characteristic mushy or soft eating texture. In the case of tomatoes, green beans, grapes, apples and potatoes the products undergo a considerable deterioration in their textural characteristics as a result of the freezing operation, which deterioration is manifest upon thawing the product. This degradation can be aggravated by further treating the product, such as by heating the product to a fully cooked state or by combining the treated material with an extraneous liquid or semi-liquid flavoring substance, such as a sauce or dressing. Therefore, when a prepared fruit or vegetable such as a sliced, cooked, and frozen potato product is combined with a liquid or semi-liquid flavoring material such as a chilled salad dressing, a further destruction in the cellular structure evidenced by a discoloration and softening in the cellular tissue upon thawing is experienced. This problem of deterioration on thawing is manifest in the production of a frozen potato salad. It has been found that when sliced, cooked potatoes are blended with a mayonnaise or other salad dressing and the product undergoes freezing, the potatoes in the salad tend to become soft and spongy when the product is thawed for serving. The use of conventional "fast" freezing techniques, such as blast tunnel freezing will not prevent this adverse change in potato texture. Indeed, it has been found that the use of extreme immersion freezing techniques wherein the potato salad is immersed in a liquid refrigerant, such as nitrogen, or nitrous oxide, will not provide a satisfactory potato salad which is amenable to all forms of thawing operations, be it a rapid thaw or a slow thaw.

It is accordingly an object of this invention to improve the textural characteristics of frozen fruits and vegetables.

It is a more specific object of this invention to improve the thawing characteristics of frozen fruits and frozen vegetables which are combined with a semi-liquid or liquid flavoring material which is preserved at freezing temperatures and adapted to be used as a ready-to-eat food upon thawing.

In accordance with this invention the raw edible plant material is subjected to a soaking treatment in a soluble calcium salt solution to increase the cellular firmness of the plant material to an extent sufficient to withstand the stresses of a quick-freezing and thawing operation. The plant is then subjected to direct contact with a liquefied volatile refrigerant having a boiling point of below −10° F. at atmospheric pressure. The liquid refrigerant converts the moisture of the plant material to small ice crystals which do not materially rupture the cellular walls of the plant. This operation is performed in a matter of seconds by the direct transfer of heat from the plant material to the volatile refrigerating liquid. The frozen material is then combined with an edible non-frozen liquid or semi-liquid flavoring substance, and packaged into suitable containers to form a frozen ready-to-eat food which is preserved at a temperature of below 15° F. The product upon thawing has a consistency, turgidity, and uniform firmness similar in all respects to the freshly prepared product.

It is believed to be a feature of this invention that the raw edible plant material has its thawing consistency improved by subjection to a blanching or soaking treatment in a soluble calcium salt solution for a sufficient period of time so as to allow the calcium ions to permeate the entire cellular structure and react with the low methoxy pectinaceous material to form a firm calcium pectinate structure which preserves the textural characteristics of the food material as it is frozen and thawed. The calcium dip may be conducted at elevated temperatures or at normal room temperatures in combination with a normal blanching operation at higher temperatures. The firmed material is then quick-frozen by contact with a volatile liquid refrigerant, preferably in 20–60 seconds, and combined with a semi-liquid flavoring material which adheres to the quick-frozen product during packaging. The liquid material is then frozen to the solid food and the product is stored or preserved at a temperature of below 15° F.

Although the calcium dip may be conducted at normal room temperatures along with a normal blanching operation to achieve texture control, it is usually conducted at an elevated temperature which advantageously may be that temperature at which the fruit or vegetable is cooked to an edible consistency. In the case of most vegetables the calcium dip may be performed in about 4–9 minutes at blanching temperatures of between 140°–212° F. In the case of potato slices of ⅕ to ⅙-inch thickness, suitable for use in a frozen potato salad, the calcium dip will be about 7 minutes at a preferable blanching temperature of about 180° F. If the fruit or vegetable material is not to be subjected to a cooking operation the blanching operation may be extended for a longer period of time. In any event calcium dips of about 6–8 minutes at blanching temperatures are suitable for most fruits and vegetables. However, in the case of certain plant materials the blanching operation may be reduced considerably due to the enzyme and cellular distribution of the plant. Tomatoes, for example, are effectively blanched in a hot solution of calcium salt which is at a temperature of 180°–200° F. in 1–3 minutes. This relatively quick blanch is apparently possible because the catalase enzymes of the tomato are predominantly present only in the surface portion of the tomato, just under the skin or peel portion.

While it has been found that any water soluble calcium salt is advantageous in increasing the firmness and textural consistency of frozen foods, it is a preferred feature of this invention that the calcium salts of the alpha-hydroxy acids such as calcium gluconate, calcium lactate, calcium citrate, calcium acetate and the like be used. Of these alpha-hydroxy acid salts of calcium, the most preferred salts are calcium lactate and calcium gluconate. Of course, other calcium salts such as calcium chloride, etc., while not preferred, may also be used. The concentration of the calcium salt is usually less than 10%, typically about 1% to 7%.

After the blanching treatment has been performed on the particular fruit or vegetable, it is a necessary feature of this invention that the blanched product be quickly or instantly frozen in a matter of seconds. The quick-freezing operation is accomplished by contacting the blanched product with a non-toxic liquefied gas, typically liquid nitrogen, liquid nitrous oxide, liquid carbon dioxide or any one of the liquid "Freons" of the type produced by E. I. du Pont de Nemours and Company of Wilmington, Delaware. The liquid "Freons" which can be used are those considered non-toxic by the United States Food and Drug Administration (F.D.A.) for direct contact with foods. Toxicological tests indicate most of the fluorinated hydrocarbons produced by the Du Pont Company to be classified into group 6 of the Underwriters' Laboratories toxicity classification of refrigerants, i.e. compounds which appear to produce no injury when the vapors are in concentrations up to at least 20% by volume for duration of exposure of at least 2 hours. Typical of the "Freon" type compounds which can be used are dichlorodifluoromethane (Freon 12), symdichlorodifluoromethane, monochlorodifluoromethane (Freon 22), perfluorochlorobutane, and octafluorocyclobutane (Freon 318). In any event the direct contact of the fluorinated refrigerant with the foodstuff should have no adverse effect on the odor, flavor, appearance, texture, etc., of the frozen food and the freezing time should be as rapid as possible, i.e., potato slices, tomato wedges, cut green beans, and grapes should preferably be frozen within 20–60 seconds and the freezing time should never exceed 3 minutes. Of course the freezing rate will depend on the size of the food, and the boiling point of the refrigerant. The direct contact with the food should be performed in such a manner as to keep the fluorine addition in the particular food under a level of 1.4 parts per million (p.p.m.) of fluorine. The generation of excessive amounts of chlorine should also be avoided during the direct contact since excess hydrochloric acid is obviously not desirable in the frozen product.

It is a distinct feature of this invention that the particular fruit or vegetable product have its texture preserved prior to commingling with the liquid or semi-liquid flavoring material by a freezing operation which is performed by direct contact with a volatile liquid refrigerant having a boiling point below 10° F. Preferably, this liquid refrigerant should boil at a temperature of −150° to −10° F. at atmospheric pressure. Liquid refrigerants with lower boiling points do not accelerate the rate of freezing. For example, liquid nitrogen which boils at −320° F. does not freeze faster than liquid "Freon 12" which boils at −20° F. Freezing is accomplished by direct immersion of the product in the refrigerant, or by spraying the liquid refrigerant onto the particular product. Liquid nitrous oxide which has a boiling point of −127° F. at atmospheric pressure and the liquid Freons which have boiling points of −70° to −10° F. at atmospheric pressure are admirably suited for the freezing technique of this invention. Since the products of this invention are usually reduced in size and then combined with a liquid or semi-liquid flavoring substance such as a sauce, salad dressing, etc., a freezing period of ½–3 minutes, typically 20–60 seconds, is suitable to uniformly freeze the fruit or vegetable piece throughout its cellular structure. The moisture or water content of the particular fruit or vegetable is frozen into tiny ice crystals which do not rupture or degrade the calcium firmed cellular structure of the product upon thawing from a frozen state.

After the particular fruit or vegetable such as potato slices, tomato wedges, cut beans or grapes are frozen for ½–3 minutes in the liquid refrigerant at a preferable temperature of −150° to −10° F. the frozen products are combined with a liquid flavoring medium such as a mayonnaise type salad dressing conventionally used in making a fruit or vegetable salad. The flavoring medium should be non-frozen and in a flowable state, namely liquid or semi-liquid, when it is combined with the frozen product. The flavoring material may be chilled to a temperature of about 40° F. and then combined with the frozen product. The chilled flavoring material adheres almost instantly to the frozen food and is immediately packaged in hermetically sealed containers such as plastic pouches and the like, and stored at a temperature of below 15° F. The frozen product can be preserved indefinitely at temperatures below 15° F. The frozen fruit or vegetables thaw to a firm and uniform consistency similar to the freshly prepared product when subjected to a rapid or slow thaw.

The invention will now be more specifically described by reference to the following examples.

*Example I*

Fresh whole potatoes are peeled, trimmed, and then cut in half along their longitudinal axis. The potatoes are sliced into long strips of about ⅙-inch square thickness. The potato slices are then blanched or cooked at a temperature of 180° F. in an aqueous solution of calcium lactate salt, the concentration of calcium lactate salt being about 3%. The potatoes are heated in this solution for about 7 minutes until the firming effect of the calcium lactate blanch has penetrated the inner cellular tissue of the potato slices. The slices are then removed from the blanch water and drained of excess salt solution. The potato slices are pre-cooled in air to temperatures of about 40° F. and then subjected to quick-freezing by direct immersion of the various potato pieces in liquid dichlorodifluoromethane which has a boiling point of −21° F. at atmospheric pressure. The frozen potato pieces are then combined with a suitable portion of chilled salad dressing which has been kept at a temperature of about 40° F. The salad dressing is any semi-liquid salad dressing commonly used in making fruit and vegetable salad. Upon addition of the chilled salad dressing to the frozen potato pieces the liquid dressing itself adheres to the potato pieces and is packed in cellophane bags. The product is then refrozen in a blast freezer at a temperature of −20° F. and preserved at about 0° F. during distribution and storage. Such product will retain the characteristic firmness of freshly cooked potatoes at 0° F. for a period of several months. The product will show no discernible signs of mushiness or discoloration upon room temperature thawing (68° F.) or upon slow thawing at normal refrigeration temperatures of 40° to 50° F.

*Example II*

The procedure of Example I is followed with the exception that fresh whole tomatoes are used which are merely sliced lengthwise into wedges and blanched at 180° F. for about 4 minutes. The tomato wedges are then frozen for 3 minutes in liquid octafluorocyclobutane which has a boiling point of −20° F. at atmospheric pressure. The frozen product is then combined with a chilled salad dressing, packaged, refrozen at −10° F. and stored at below 15° F. The tomato slices experience no mushiness or softness upon thawing.

While this invention has been described by reference to particular examples it is intended to be limited only by the scope of the appended claims.

What is claimed is:

1. A process for improving the thawing consistency of fruit and vegetable salad which comprises soaking said fruits and vegetables in a solution of calcium ions to increase the cellular firmness of the fruits and vegetables, quick-freezing the moisture in said fruits and vegetables into ice crystals which do not rupture the cellular structure of the fruits and vegetables, combining said quick-frozen fruits and vegetables with a flowable salad dressing, freezing said salad dressing to said fruits and vegetables to produce a frozen mixture and preserving said frozen mixture at a temperature of below 15° F.

2. The process of claim 1 wherein the calcium soak is conducted at a temperature of 140°–212° F.

3. The process of claim 1 wherein the volatile liquid refrigerant has a boiling point of −150° to −10° F. at atmospheric pressure.

4. A process for improving the thawing consistency of potato salad which comprises cutting potatoes into slices, blanching said slices in a solution of calcium ions for 4–9 minutes at a temperature of 140°–212° F., quick-freezing said slices by direct contact with a volatile liquid refrigerant having a boiling point of below 10° F. at atmospheric pressure to freeze said slices without rupturing the cells thereof, combining said frozen slices with a flowable salad dressing to thereby freeze said dressing to the potato slices, and preserving said slices at a temperature of below 15° F.

5. The process of claim 4 wherein the slices are blanched at a temperature of 180° F.

6. The process of claim 4 wherein the slices are blanched in a calcium gluconate solution.

7. The process of claim 4 wherein the slices are blanched in a calcium lactate solution.

References Cited in the file of this patent

UNITED STATES PATENTS

| | | |
|---|---|---|
| 2,164,362 | Taylor | July 4, 1939 |
| 2,308,486 | Bartlett | Jan. 19, 1943 |
| 2,418,745 | Bartlett | Apr. 8, 1947 |
| 2,419,877 | Birdseye | Apr. 29, 1947 |
| 2,531,431 | Hills | Nov. 28, 1950 |

OTHER REFERENCES

Quarterly Bulletin, Michigan Agricultural Experiment Station, Michigan State University, East Lansing, vol. 40, No. 1, pp. 51 to 58, August 1957, 99–193 lit. (Copy in Div. 63.)